C. F. LEMASSENA.
MEASURING INSTRUMENT.
APPLICATION FILED MAR. 20, 1916.
1,199,471.
Patented Sept. 26, 1916.
2 SHEETS—SHEET 2.
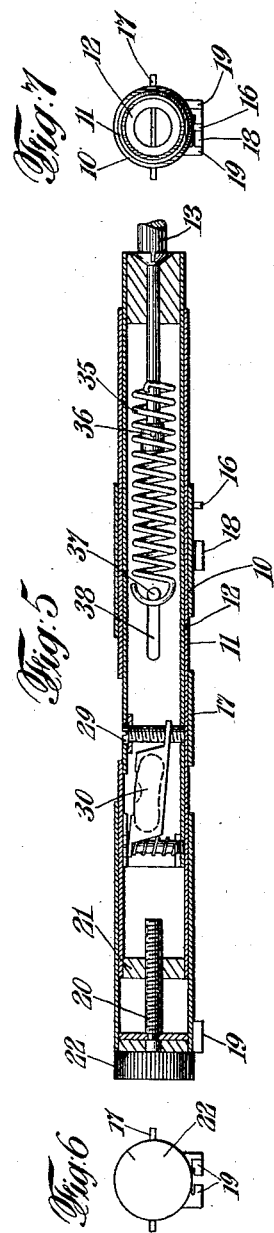
INVENTOR
Clement F. Lemassena
BY
ATTORNEY

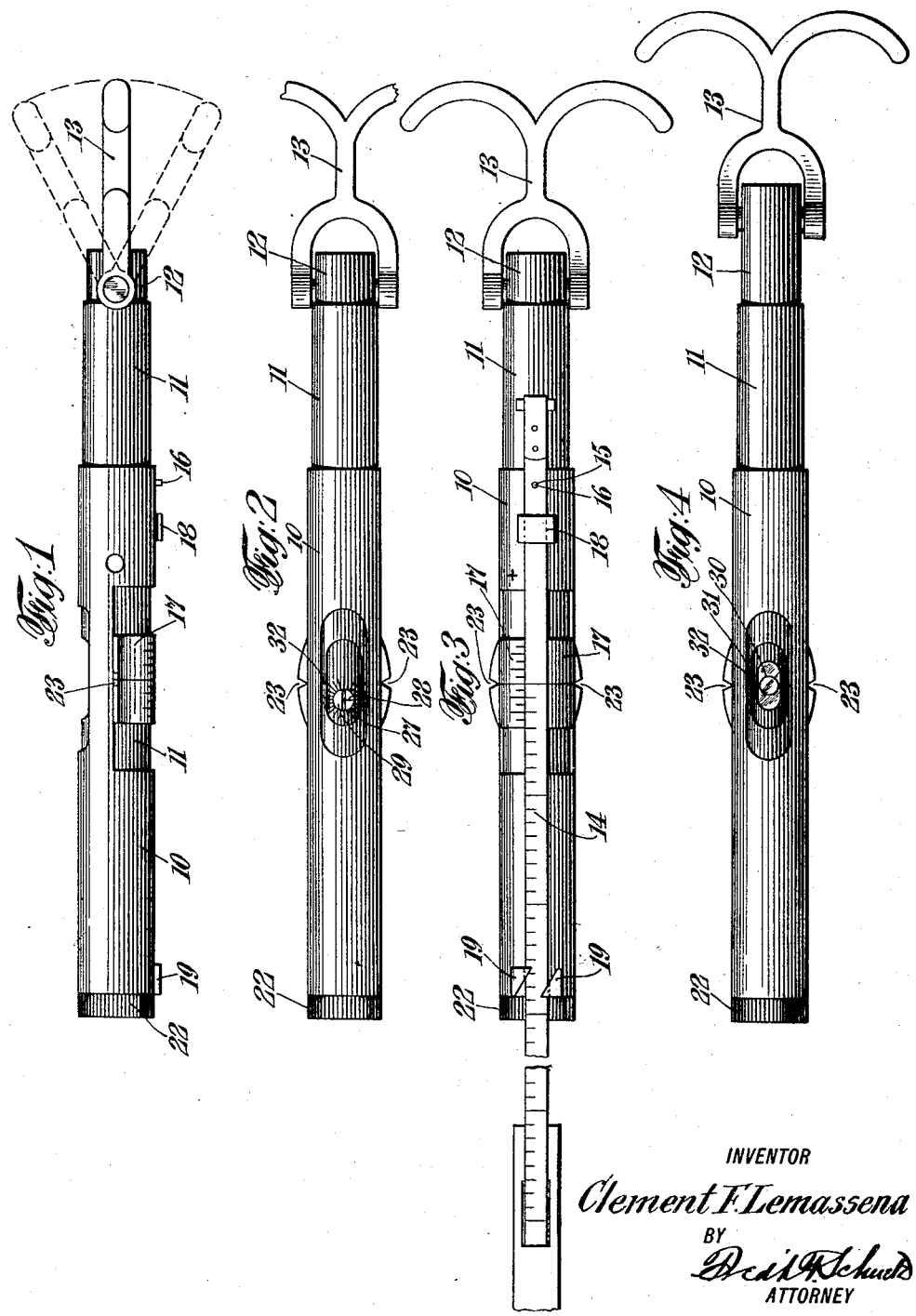

UNITED STATES PATENT OFFICE.

CLEMENT F. LEMASSENA, OF NEWARK, NEW JERSEY.

MEASURING INSTRUMENT.

1,199,471.  Specification of Letters Patent.  Patented Sept. 26, 1916.

Application filed March 20, 1916. Serial No. 85,347.

*To all whom it may concern:*

Be it known that I, CLEMENT F. LEMASSENA, a citizen of the United States, and a resident of Newark, in the county of Essex and State of New Jersey, have invented certain new and useful Improvements in Measuring Instruments, of which the following is a specification.

The invention relates to improvements in measuring instruments, adapted for use with measuring tapes as employed by surveyors, and in which independently adjustable means are provided to afford proper tension on the tape, to determine a level position of the tape, and to accommodate for expansion and contraction of the same, due to variation of temperature.

It has for its object to admit of the use of a tape upon which are indicated both terminal points, and to so associate the various indications of the instrument that the same will appear at a common position, readily visible.

The nature of the invention will be best understood when described in connection with the accompanying drawings, in which—

Figure 1 is a front elevation of the instrument. Fig. 2 is a plan thereof. Fig. 3 is an underneath view. Fig. 4 is a view similar to Fig. 2 but showing the instrument extended to provide the necessary tension. Fig. 5 is a longitudinal section. Figs. 6 and 7 are end views.

Similar characters of reference designate corresponding parts throughout the several views.

Referring to the drawings, the instrument is shown as consisting of a plurality of telescoping, or nested, tubular members or sleeves, 10 designating the outer or tape tube, 11 the intermediate or scale tube and 12 the inner or tension tube. The latter tube is provided at one end with a suitable handle or finger-piece 13 which is pivotally connected thereto for holding the instrument when exerting the proper tension upon a flat tape 14. This tape is adapted to be secured to the outer tube 10, in being provided with a hole 15 fitting over a pin 16 of said tube. Its graduations are such that the terminal point at the secured end is rendered adjustable relatively to a suitably graduated temperature-compensating scale plate 17, the said tape being held to the tubular member 10 by means of an inner strap 18, under which it passes, and two end strap pieces 19. These end strap pieces are provided with parallel sides (Fig. 3), directed diagonally with respect to the longitudinal axis of the instrument and having intermediate space sufficient to admit the tape. An entrance-undercut, moreover, is provided in one and an exit-undercut in the other of said pieces, the sides of which undercut portions are parallel to the longitudinal axis of the instrument, and the space between the same substantially equal to the width of the tape. In securing the tape, it is placed diagonally in the space between the two strap pieces, pressed down and then moved parallel to the longitudinal axis of the instrument, sprung under the strap 18, and the hole 15 slipped over the pin 16. A standardized tape may, therefore, be employed, as the two terminal points are on the said tape itself, the distance between same at a definite temperature being positively fixed and subject to compensation for temperature variations by the scale 17 which, as aforesaid, is adjustable relatively to the said tape. To effect this adjustment, the intermediate sleeve or tube 11, carrying the scale plate 17, is longitudinally adjustable with respect to the outer and tape-carrying sleeve 10, which is provided with suitable indications, such as (+) and (−), to indicate the direction in which the adjustment is to be made. The preferred means of moving the one tube relatively to the other is a slow movement screw 20 passing freely through the smooth-bored outer end of the tube 10, and fitting into a threaded plug 21 of the end of the intermediate tube or sleeve 11. The pitch of the screw 20 may be such that, by giving its suitably marked and milled head 22 a complete turn, 0.04 of an inch longitudinal movement will result—or 0.01 of an inch for one-quarter revolution thereof.

To the scale plate 17 are attached the sight notches 23 in line with the zero mark of the scale, and in which the plumb line (not shown) is guided. The inner tube is provided with a circular scale 27 coöperating with a mark 28 of a screw 29 for adjusting in well-known manner the spirit level 30, to adapt the instrument to various lengths of tape. Such adjustment is necessary because of the fact that the angle of the level under a given tension of the tape varies with the length of the tape used. It is to be noted in connection with the level that the same is provided with an indicator mark 31 (Fig. 4), with which the bubble coöperates; and which, also, is adapted to register with a mark 32 of the intermediate tube 11 to indicate that the proper tension is placed upon the tape. Moreover, when the two indicator marks 31 and 32 register, it is to be noted that both are in the same plane as the notches 23 and the zero line of the scale 17.

To provide the requisite tension on the tape, a spring 35 (Fig. 5) is mounted within the inner tube 12, being secured at one end to the said tube through a rotatable block and pin member 36, by means of which its tension may be suitably adjusted in lengthening or shortening said spring. The other end of said spring is attached to a pin 37 extending from the intermediate tube 11 through slots 38 of said tube 12. Thus, when the latter is drawn outwardly by exerting a pull on the finger-piece 13, the tubes 10 and 11, the former carrying the tape, are placed under a tension whose proper value is attained when the mark 32 registers with the mark 31.

By the construction hereinbefore set forth all of the indications, are readily visible and conveniently arranged at one particular position, thereby rendering the operation of the instrument more simple and less liable to error. Furthermore, in view of the fact that the terminal points at both ends of the tape are on the tape itself, which is directly attached to the instrument, and thus avoiding the use of attaching hooks, rings and the like, it becomes possible to employ standardized tapes with the instrument.

I claim:

1. A measuring instrument for use with surveyors' tapes, comprising: a plurality of telescoping members, to one of which an end of the measuring tape with the terminal point marked thereon is attachable, said member being relatively adjustable with respect to another of said telescoping members; means to effect such adjustment; a scale carried by one of said relatively adjustable members; and means to exert a predetermined tension upon said members.

2. A measuring instrument for use with surveyors' tapes, comprising: an outer tubular member, to which one end of the tape is adapted to be attached; an intermediate tubular member slidable relatively to and within said outer member; a scale carried by said intermediate member; a third or inner tubular member movable relatively to said outer and intermediate members; resilient means within said inner member, movable therewith and attached to said intermediate member to exert a predetermined tension thereon when the said inner member is drawn outwardly.

3. A measuring instrument for use with surveyors' tapes, comprising: an outer tubular member, to which one end of the tape is adapted to be attached; an intermediate tubular member slidable relatively to and within said outer member; a scale carried by said intermediate member; a third or inner tubular member movable relatively to said outer and intermediate tubular members; resilient means within said inner member, movable therewith and attached to said intermediate member to exert a predetermined tension thereon when the inner member is drawn outwardly; and means to adjust the tension of said resilient means.

4. A measuring instrument for use with surveyors' tapes, comprising: an outer tubular member, to which one end of the tape is adapted to be attached; an intermediate tubular member having a smooth-bored hole through its end; a scale carried thereby; means to move said intermediate tube relatively to said outer tube, and consisting of a screw threaded into said intermediate member, passing through the smooth-bored end of said outer tube, and provided with a suitable head to effect the rotation of said screw; and means to exert a predetermined tension upon said tubes.

5. A measuring instrument for use with surveyors' tapes, comprising: an outer tubular member, to which one end of the tape is adapted to be attached; an intermediate tubular member having a smooth-bored hole through its end; a scale carried thereby; means to move said intermediate tube relatively to said outer tube, and consisting of a screw threaded into said intermediate member, passing through the smooth-bored end of said outer tube, and provided with a suitable head to effect the rotation of said screw; a third or inner tubular member provided with longitudinal slots; a spring mounted in said tube and secured to one end thereof; and a pin extending from the intermediate tube through the slots of said inner tube, and to which pin is attached the other end of said spring.

6. A measuring instrument for use with surveyors' tapes, comprising: a plurality of tubular members, the one fitting within the other and slidable relatively thereto, one being provided with an outwardly extending pin and with a strap and two strap pieces, the tape being adapted to be inserted under said strap members and provided with a hole to fit over said pin to attach the tape to said outer tube.

7. A measuring instrument for use with surveyors' tapes, comprising: a plurality of telescoping members, one being provided with an outwardly extending pin, and strap pieces thereon having parallel sides diagonally disposed with respect to the longitudinal axis of the measuring instrument, separated sufficiently to admit the tape, and provided with an entrance-undercut and an exit-undercut portion parallel to the longitudinal axis of the measuring instrument and having space between same sufficient to admit the said tape.

8. A measuring instrument for use with surveyors' tapes, comprising: an outer tube provided with an outwardly extending pin and with a strap and two strap pieces, the tape being adapted to be inserted under said strap members and provided with a hole to fit over said pin to attach the tape to said outer tube; an intermediate tube slidable relatively to and within the outer tube; and means to effect an adjustment between said two tubes; a scale plate provided on the intermediate tube, having graduations arranged to coöperate with the graduations of the end of said tape and having, furthermore, sight notches in line with the zero mark of the scale, whereby variations of temperature affecting the length of said tape may be compensated for by adjusting the intermediate tube relatively to the outer tube; and means to exert a predetermined tension upon said tubes.

9. A measuring instrument for use with surveyors' tapes, comprising: an outer tube to which one end of the tape is adapted to be attached; an intermediate tube slidable relatively to and within the outer tube; and means to effect an adjustment between said two tubes; a scale plate provided on the intermediate tube, having graduations arranged to coöperate with the graduations of the end of said tape and having, furthermore, sight notches in line with the zero mark of the scale, whereby variations of temperature affecting the length of said tape may be compensated for by adjusting the intermediate tube relatively to the outer tube; an inner tube movable relatively to said outer and intermediate tubes; and tension-exerting means acting upon said outer and intermediate tubes, contained within said inner tube, which is provided with a suitable mark visible, when the proper tension is exerted, through the said intermediate and outer tubes, and in the plane of the zero mark of the compensating scale and sight notches.

Signed at Newark in the county of Essex and State of New Jersey, this fifteenth day of March, A. D. 1916.

CLEMENT F. LEMASSENA.

Copies of this patent may be obtained for five cents each, by addressing the "Commissioner of Patents, Washington, D C."